US010237836B2

(12) United States Patent
Navalekar et al.

(10) Patent No.: US 10,237,836 B2
(45) Date of Patent: Mar. 19, 2019

(54) FREQUENCY AND PHASE SYNCHRONIZATION USING FULL DUPLEX RADIOS OVER WIRELESS MESH NETWORKS

(71) Applicant: Parallel Wireless, Inc., Nashua, NH (US)

(72) Inventors: Abhijit Navalekar, Westford, MA (US); Rajesh Kumar Mishra, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/735,007

(22) Filed: Jun. 9, 2015

(65) Prior Publication Data
US 2015/0358930 A1    Dec. 10, 2015

Related U.S. Application Data

(60) Provisional application No. 62/009,610, filed on Jun. 9, 2014.

(51) Int. Cl.
*H04J 1/00*    (2006.01)
*H04W 56/00*    (2009.01)
(Continued)

(52) U.S. Cl.
CPC ........ *H04W 56/001* (2013.01); *H04B 7/0413* (2013.01); *H04L 5/14* (2013.01)

(58) Field of Classification Search
None
See application file for complete search history.

(56) References Cited

U.S. PATENT DOCUMENTS 6,201,796 B1    3/2001  Agazzi et al.
6,377,640 B2 *  4/2002  Trans ..................... H04B 1/00
                                                370/286
(Continued)

FOREIGN PATENT DOCUMENTS

CA    2433110 A1    6/2004
CN    2245307 Y     1/1997
(Continued)

OTHER PUBLICATIONS

D. Bharadia et al., "Full Duplex Radios," In Proc. ACM SIGCOMM'13, 2013.
(Continued)

*Primary Examiner* — Chi H Pham
(74) *Attorney, Agent, or Firm* — Michael Y. Saji; Keyur Parikh

(57) ABSTRACT

An approach is disclosed for synchronization of frequency and/or phase in a full duplex network. The method may comprise sending a timing beacon over a single full duplex radio channel from a timing master to a timing slave; receiving the timing beacon over the single full duplex radio channel at the timing slave; sending a retransmitted beacon over the single full duplex radio channel from the timing slave to the timing master; and sending a delta of the timing beacon and the retransmitted beacon from the timing master to the timing slave. The beacon may contain a timestamp. The retransmitted beacon may include a delay calculation. A hybrid analog/digital self-interference cancellation system may be used at the timing master or the timing slave. The method may also include simultaneously sending and receiving the synchronization information over the single full duplex radio channel.

24 Claims, 4 Drawing Sheets

(51) Int. Cl.
*H04L 5/14* (2006.01)
*H04B 7/0413* (2017.01)

(56) References Cited

U.S. PATENT DOCUMENTS

| | | | |
|---|---|---|---|
| 7,817,641 B1 | 10/2010 | Khandani | |
| 8,179,950 B2 | 5/2012 | Agazzi et al. | |
| 8,565,270 B2 | 10/2013 | Wang et al. | |
| 9,048,979 B2 | 6/2015 | Park | |
| 9,078,286 B1 | 7/2015 | Yuan et al. | |
| 9,577,725 B1* | 2/2017 | Yuan | H04W 24/02 |
| 2002/0181633 A1 | 12/2002 | Trans | |
| 2004/0008661 A1* | 1/2004 | Myles | H04J 3/0664 370/350 |
| 2005/0201421 A1* | 9/2005 | Bhandari | H04J 3/0682 370/519 |
| 2006/0083186 A1 | 4/2006 | Handforth et al. | |
| 2006/0291537 A1* | 12/2006 | Fullerton | G01S 7/4052 375/145 |
| 2007/0030809 A1 | 2/2007 | Dayama | |
| 2011/0103499 A1* | 5/2011 | Cheng | H04W 56/0005 375/260 |
| 2012/0281603 A1* | 11/2012 | Takatori | H04L 5/1423 370/286 |
| 2013/0102254 A1 | 4/2013 | Cyzs et al. | |
| 2013/0301487 A1 | 11/2013 | Khandani | |
| 2014/0086120 A1 | 3/2014 | Mishra et al. | |
| 2014/0206368 A1 | 7/2014 | Maltsev et al. | |
| 2015/0045063 A1 | 2/2015 | Mishra et al. | |
| 2015/0078167 A1 | 3/2015 | Papa et al. | |
| 2015/0092797 A1* | 4/2015 | Aweya | H04J 3/0667 370/516 |
| 2016/0242226 A1 | 8/2016 | Fushiki et al. | |

FOREIGN PATENT DOCUMENTS

| | | |
|---|---|---|
| DE | 102011112629 A1 | 1/2013 |
| EP | 2574221 A2 | 4/2013 |
| WO | 2011138023 A2 | 11/2012 |

OTHER PUBLICATIONS

Hong et al., "Applications of self-interference cancellation in 5G and beyond," IEEE Communications Magazine, Feb. 19, 2014, pp. 114-121, vol. 52, Issue 2, IEEE (abstract only; full paper not available to Applicant).

A. Khandani, "Two-Way Wireless," Presentation given at University of Waterloo, Apr. 25, 2012, Ontario, Canada.

P. R. Kumar, "Clock Synchronization over Wireless Networks," Jun. 30, 2009, Champaign, IL.

"Full-Duplex Project," Stanford Networked Systems Group, available at http://snsg.stanford.edu/projects/full-duplex and retrieved from https://web.archive.org/web/20140130151338/http://snsg.stanford.edu:80/projects/full-duplex/ as saved on Jan. 30, 2014.

* cited by examiner

FREQUENCY AND PHASE SYNCHRONIZATION USING FULL DUPLEX RADIOS OVER WIRELESS MESH NETWORKS

PRIORITY STATEMENT

This application claims the benefit under 35 U.S.C. § 119 of U.S. Provisional Patent Application No. 62/009,610, "Methods for time, frequency, and phase synchronization using full duplex radios over wireless mesh networks," which is hereby incorporated by reference in its entirety for all purposes. Additionally, U.S. Pat. App. Pub. Nos. US20140086120, US20150045063, and US20150078167 are also hereby incorporated by reference in their entirety for all purposes.

BACKGROUND

Network-wide synchronization is a critical element in wireless networks. In the case of wireless mesh networks, frequency synchronization and phase synchronization (or, equivalently, time synchronization) are both important. There are a number of protocols, such as IEEE 1588 or SyncE, that address this issue in wired networks. However, these protocols are inadequate for wireless mesh networks due to the variability in wireless link performance. Global positioning system (GPS)-aided synchronization is often deployed in these scenarios to ensure that multiple nodes can work in unison. However, such a solution requires nodes to be placed in GPS-friendly locations, which may not always be an option. Non-synchronized wireless nodes can cause interference among neighbors, which can dramatically impact the throughput of the network.

SUMMARY OF INVENTION

We propose an approach for network synchronization in a full duplex mesh network. The term network synchronization may be used to refer to one or more of the three aspects, viz.: time (time of the day), frequency, and phase. The methods and algorithms proposed in this application may be used for disbursing timing information over the mesh network, which can increase the channel utilization of the network and mitigate interference.

In some embodiments, a method may be used, comprising: sending a timing beacon over a single full duplex radio channel from a timing master to a timing slave; receiving the timing beacon over the single full duplex radio channel at the timing slave; sending a retransmitted beacon over the single full duplex radio channel from the timing slave to the timing master; receiving the retransmitted beacon over the single full duplex radio channel at the timing master; and sending a delta of the timing beacon and the retransmitted beacon from the timing master to the timing slave.

The beacon may contain a timestamp. The retransmitted beacon may be a result of processing performed on the beacon. The sending of a beacon may be performed by a timing master and sending of a retransmitted beacon may be performed by a timing slave. A plurality of antennas at the timing master or the timing slave may be used in a multiple-in, multiple out (MIMO) system. A plurality of antennas at the timing master or the timing slave may be used in a diversity antenna system. A single antenna for both the sending and the receiving may be used in conjunction with a full duplex transceiver at the timing master or the timing slave. A hybrid analog/digital self-interference cancellation system may be used at the timing master or the timing slave. The method may also include simultaneously sending and receiving the synchronization information over the single full duplex radio channel. The method may also include sending a delta of the beacon and the retransmitted beacon over the single full duplex radio channel. The method may also include determining a carrier frequency offset using the delta, and calibrating a frequency of a local oscillator using the carrier frequency offset.

In some embodiments, a system is disclosed, comprising: a timing master having full duplex capability and configured to transmit a timing beacon signal and to receive a timing response signal; and a timing slave configured to receive the timing beacon signal and configured to send the timing response signal based on the received timing beacon signal.

The system may also include a plurality of timing slaves in communication with the timing master, and/or a central entity for coordinating the timing master and the timing slave. The timing master may be coupled to a global positioning system (GPS) timing source or a network time source. The timing response signal may contain a retransmitted timing beacon signal. The timing master may be configured to transmit the timing beacon signal with an identifier of the master node. The timing master may be configured to compute a delay between transmitting the timing beacon signal and receiving the retransmitted timing beacon signal, and to generate a synchronization offset specific to the timing slave. The timing master may be configured to send the synchronization offset to the timing slave. The timing master may be configured to permit frequency synchronization or phase synchronization of the timing slave.

DETAILED DESCRIPTION OF THE INVENTION

Figure 1:
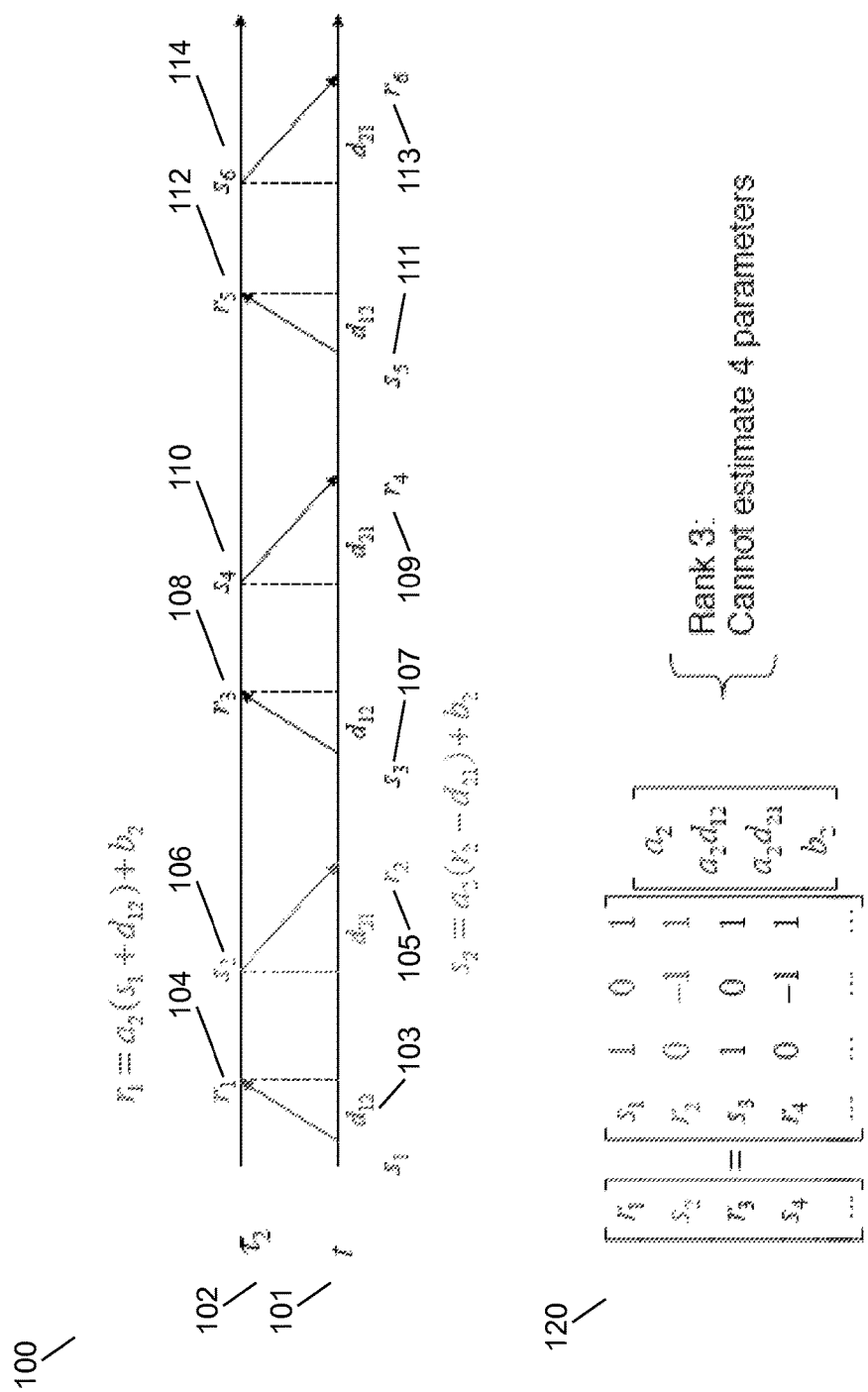
FIG. 1 is a depiction of a sequence diagram for synchronizing two network nodes, in accordance with some embodiments.

Wireless base stations may use multiple antennas to communicate with, for example, each other or to user equipments (UEs), thereby providing access to those UEs, and a macro-cell base station to provide backhaul for the UEs. The wireless connection is known as an air interface, and is implemented as a combination of a physical layer and a medium access control (MAC) layer.

However, in traditional wireless networks, the physical layer is implemented as a half-duplex channel and may be used only for either transmit or receive. In order to provide both transmit and receive capability, either time multiplexing (time division duplex, or TDD) the same channel or by use of a separate frequency channel (frequency division duplex, or FDD).

Recent advances in antenna design and signal cancellation methods have enabled the use of a full duplex physical channel. The use of full duplex has been shown to result in significant improvements in the throughput of a system/link.

Most of the changes made for enabling full duplex have been on the physical or medium access control (MAC) layers. As a single radio physical channel is understood to mean at least a carrier frequency, and potentially also including a scrambling code, channelizing code, start/stop time/duration, relative phase, and/or signature sequence, a full duplex radio physical channel is a radio physical channel on which both uplink and downlink communications (receive and transmit) are being performed simultaneously using the same channel parameters.

Also known in the art are techniques for providing self-interference cancellation (SIC). With SIC, the signal transmitted by a node does not self-interfere with the signal it receives from other nodes. The antenna layout and digital cancellation systems at each node is configured for SIC. See, e.g., "Applications of Self-Interference Cancellation in 5G and Beyond" by Hong et al., IEEE Comm's Magazine, Vol. 52, No. 2 (2014); "Full Duplex Radios," Bharadia et al., SIGCOMM 2013; and Home Page of the Stanford Networked Systems Group, Full Duplex Project, available at http://snsg.stanford.edu/projects/full-duplex/, each of which is incorporated herein by reference in their entirety. See also A. K. Khandani et al., "Two-Way Wireless," presentation given at Univ. of Waterloo on Apr. 25, 2012, and U.S. Pat. No. 7,817,641, US20130301487, WO2013173250, each of which is also incorporated herein by reference in their entirety. SIC may be achieved either digitally, or in the analog domain, or using a combination or hybrid of digital and analog techniques. When effectively performed, SIC can allow a radio to transmit on the same antenna being used for receiving signals, or equivalently, from an antenna in close proximity as an antenna being used for receiving signals, thus enabling full duplex transmission.

The techniques disclosed herein may be used with any full duplex method known in the art. In some embodiments, the network synchronization may be achieved according to the non-limiting examples shown below.

The network synchronization algorithm proposed in this application may modify the physical and/or the media access control (MAC) layer in each network node. It may make use of full duplex links to reduce loss of precision as the timing information is disbursed among nodes. We also propose use of orthogonal codes like code division multiple access (CDMA), along with identifiers to verify the source of the timing and also the fidelity of the timing information.

Each identifier/code can be selected by an individual node or through use of a centralized entity. The waveform used to communicate the timing information can be an orthogonal frequency division multiplexing (OFDM) signal or a single carrier waveform spread by orthogonal codes. The waveforms that carry the timing signal are referred to as beacons or time beacons. The beacons may include a timestamp, time signature, or other encoding of the present time of day as derived at the sending node.

In the case of OFDM transmission, the nodes may use non-overlapping orthogonal frequency carriers, i.e. use OFDMA schemes to ensure non-overlapping transmissions. Only nodes that have a stable clock source can originate such timing beacons. These nodes are referred to as Timing Master (TM) nodes. A timing master node can receive the timing information either via a GPS module or by using IEEE 1588/SyncE via an Ethernet connection. In the absence of any stable time source, a node can declare itself to be a stable timing source or may be designated as such by a central entity. In one embodiment, for example, a node could be declared a stable timing source if it is connected to a GPS. In some embodiments, a list of stable timing sources may be shared among nodes. In some embodiments, timing sources may self-verify as stable timing sources; in other embodiments, other nodes, such as the central entity, may provide this verification.

A Timing Slave (TS) node, which in one embodiment could be a node with no GPS, looks for a timing signal from a TM node because it seeks to synchronize its time with a timing master or with a stable timing source. The waveform signature to be searched can be communicated to the TS node in one of the following ways: (1) by the central entity; (2) pre-configuration within the timing slave node; or (3) exchanged between the nodes using out-of-band communication. In this embodiment, the nodes using out of band communication could use an existing connection outside of the timing disbursement mechanism. These nodes could for example be connected to one another over a Wi-Fi mesh.

Once a TM signature has been identified, the signal is re-transmitted over the full duplex link. Each node within the network is transmitting and receiving because of the full duplex nature of the network. One advantage of a full duplex network is that the variability of when a transmission was sent from a particular node and received at another node reduces to a deterministic value as opposed to a random value, the deterministic value based on the path delay time and not based on factors such as whether the transmission antenna is in use by another transmission process. The use of full-duplex transceivers, therefore, ensures timing precision.

Firstly, phase synchronization (timing offset) is obtained by correlating the local copy of the TM signature with a transmitted signal. The transmitted signal can be sent using a single carrier or multicarrier mechanism like Wi-Fi, for example. By using a sufficiently high sampling rate, a higher resolution can be achieved if required. Another way to achieve phase synchronization is by using phase lock loops or phase recovery algorithms such as Gardner, Early-Late Gate amongst others, which are well known in the art.

Secondly, frequency synchronization can be achieved by estimating the carrier frequency offset (CFO) between the transmitted signal and the local reference carrier. Once the carrier frequency offset is estimated the local oscillator of the timing slave node can be calibrated to align its frequency with that of the transmitting node.

Synchronization is achieved by demodulating/decoding the transmitted waveform and by using a 'sounding' mechanism, described further below. In these embodiments, we use full duplex to calibrate the delay between the TM and TS nodes. The 'sounding' algorithm is further described. A TM node transmits a special timing beacon, which is then relayed/re-transmitted by a TS node. A central entity can arbitrate the transmission between a TM-TS pair or a pre-configured hash function can be used to ensure that only a single TS relays the signals. Because the delay associated with the full-duplex channel is negligible or known, the TM node calculates the time difference between the beacon it transmitted and the 'echo' it received from the TS node. Once the delay is calculated the TM node communicates this delta value to the TS node using either in-band/out-band transmission or through a central entity. The TS node then uses it to calculate the 'Time of the day' with high precision.

Another aspect of the algorithm deals with the phase alignment implementation for the slave node. We propose the use of time staggering to ensure phase alignment. Time staggering on TS node can be achieved two ways, in some embodiments: by configuring delays on the RFIC (Radio Frequency IC) transmit link; and/or by adding dummy data in the transmit buffer.

FIG. 1 is a depiction of a sequence diagram for synchronizing two network nodes, in accordance with some embodiments. As noted, embodiments of this invention are possible because of the full duplex nature of the nodes, in which the nodes both send and receive data simultaneously. In the prior art, it has been observed that it is impossible to synchronize two clocks in a wireless distributed network. See e.g., "Clock Synchronization over Wireless Networks," by P. R. Kumar, Dept. Electrical and Computer Engineering, University of Illinois, which is incorporated herein in its entirety. FIG. 1, described further below, shows the relationship between receive signals, transmit signals, skew and delay for two wireless nodes. In a full duplex network, the delay time between two nodes will be the same if they each transmit their signals at the same time. Delay is a function not just of the speed of light, but also of channel conditions which may delay the data. One example of channel condition is multipath, which in in turn will vary based on frequency and time. Consequently, if two data transmissions are sent from the TM and the TS at substantially the same frequency and substantially the same time, they will experience substantially the same delay. This means that variability due to differing paths is reduced. Full duplex enables and facilitates transmission by the TM and the TS at the same frequency and same time.

Diagram 100 is a sequence diagram of communications between node t1 101, which is the master node, and node t2 102, which is the slave node. At time s1 103, the master node sends a beacon signal. At time r1 104, the slave node receives the beacon signal. Delay d12 is the time between times s1 and r1. At time s2 106, the slave node sends a retransmission signal. At time r2 105, master node receives the retransmission signal and is able to determine the deltas.

At time s3 107, the master node transmits a beacon signal. At time r3 108, the slave node receives the beacon signal. At time s4 110, the slave node retransmits the beacon signal. At time r4 109, the master node receives the retransmitted signal. At time s5 111, the master node transmits a beacon signal. At time r5 112, the slave node receives the beacon signal. At time s6 114, the slave node retransmits the beacon signal. At time r6 113, the master node receives the retransmitted signal.

The delay equation corresponding to the scenario shown in FIG. 1 is:

$$\begin{bmatrix} r_1 \\ s_2 \\ r_3 \\ s_4 \\ \ldots \end{bmatrix} = \begin{bmatrix} s_1 & 1 & 0 & 1 \\ r_2 & 0 & -1 & 1 \\ s_3 & 1 & 0 & 1 \\ r_4 & 0 & -1 & 1 \\ \ldots & \ldots & \ldots & \ldots \end{bmatrix} \begin{bmatrix} a_2 \\ a_2 d_{12} \\ a_2 d_{21} \\ b_2 \end{bmatrix} \quad \text{(EQUATION 1)}$$

$$\begin{cases} \text{Rank 3:} \\ \text{Cannot estimate 4 parameters} \end{cases}$$

Note that the delays d12, d21 remain constant over multiple repetitions, to the extent that they reflect the transmit path and transmit channel, which remain constant. Note also that $r1=a2(s1+d12)+b2$, and $s2=a2(r2-d21)+b2$. By simplifying the equation based on these equalities, the Rank 3 equation shown in Equation 1 is transformed from having four unknowns to three unknowns. Equation 1, therefore, becomes solvable, which means that the methods discussed herein can be used to perform time synchronization in a full duplex network.

Stated differently, Equation 1 relates to the propagation on the signal from one node to other in one direction. This will be the same in either full or half duplex (simplex) communication, as we can always break a full duplex communication into constituent half-duplex transmissions. What will be different in full duplex communication is how many such equations are available simultaneously and with how many unknown variables.

The use of a full-duplex link reduces an under-determined system with more unknowns than the number of equations to a balanced, or in certain cases over-determined (as many or fewer unknowns as compared to the number of available equations), system. This is due to the fact that by using full duplex the channel has substantially the same latency and delay in both directions, which ultimately reduces the right-hand side of Equation 1 to three unknown variables (d12=d21).

Figure 2:
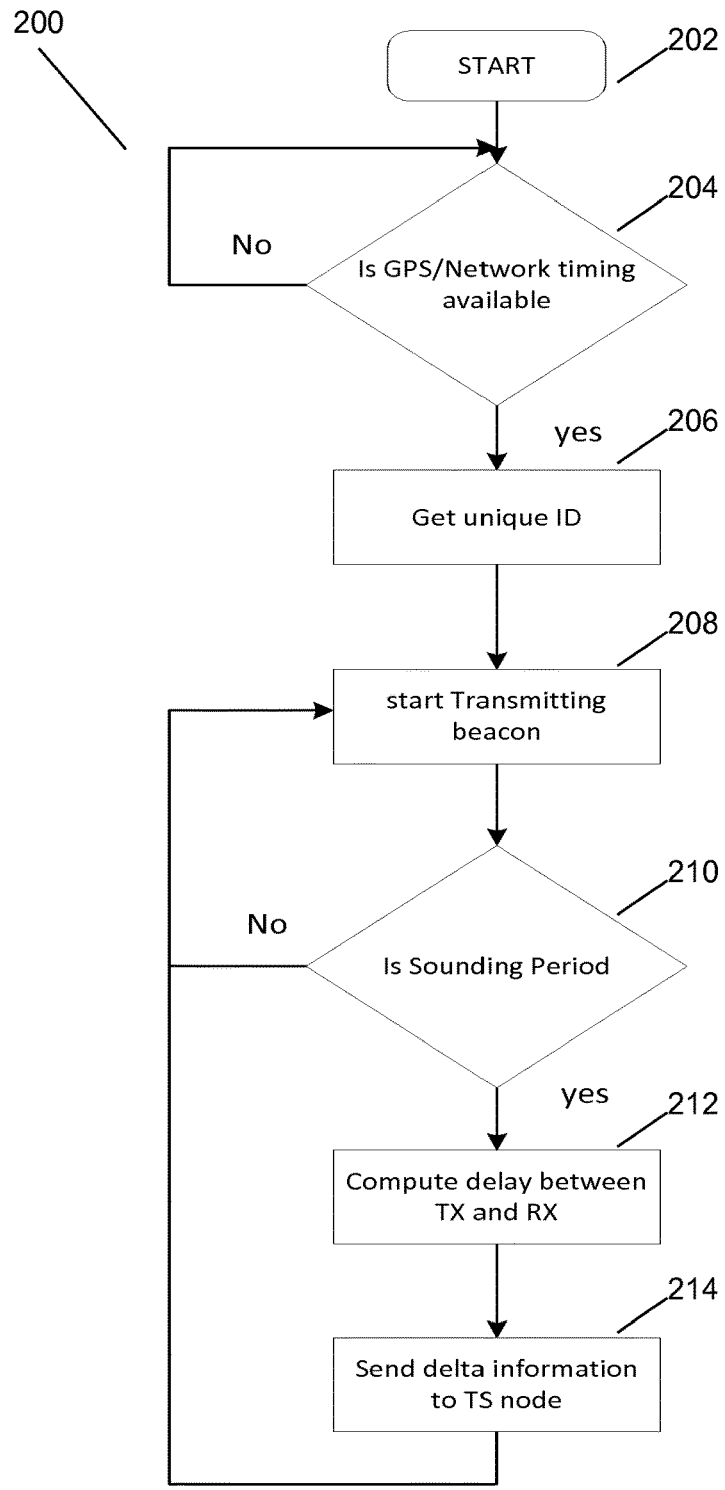
FIG. 2 is a flowchart of a method for synchronization at a master node, in accordance with some embodiments.

FIG. 2 is a flowchart of a method for synchronization at a master node, in accordance with some embodiments. At step 202, processing begins. At step 204, a determination is made regarding whether a timing source, such as GPS, IEEE 1588/SyncE, or another high-precision timing source, is available. If a timing source is available, this node should be able to become a timing master. In some embodiments, all nodes with timing sources may become timing masters. In other embodiments, only some such nodes become timing masters. In the depicted embodiment, processing for this master node stops unless a timing source is available; if a timing source is available, processing continues.

At step 206, the now-designated timing master obtains a unique ID. For example, the unique ID may be received from a central entity or cloud coordination server, or may be generated internally, in some embodiments based on a predictable algorithm that enables coordination among multiple nodes in a mesh network. At step 208, the timing master begins transmitting a beacon signal, which may include at least a timestamp, a phase, and the unique ID of the timing master. In some embodiments, each timing beacon may also have its own unique ID. The beacon signal may be transmitted during otherwise-empty transmit periods at the transmit antenna. For example, when the antenna is in use for another radio frequency transmission, the timing beacon may not be sent until antenna is no longer in use. The beacon signal may be transmitted at intervals, in some embodiments at intervals that do not interfere with other scheduled transmissions.

At step 210, the timing master enters the sounding period, during which it listens to receive a retransmission of the timing master's previously-sent beacon signal by a timing slave node. As the retransmission by the timing slave is intended to occur as soon as the timing slave receives the signal, the sounding period may begin immediately after transmission, and may use the receive signal even if other applications are also using the receive signal. If a diversity antenna is present, either the diversity antenna or the primary antenna, or both, may be used to receive the timing signal simultaneous to receiving of other signals. In a multiple-in, multiple-out (MIMO) system, one or more receive channels and one or more transmit channels may be used, including up to all of the available receive or transmit channels. In a full-duplex system, the receive channel may be used to receive simultaneously with the transmitting of information at the transmit channel, and may be used for this purpose to receive a timing signal at any time. In some embodiments, the receive channel may be shared among multiple applications, such that a timing module may receive a portion of the receive channel signal, which may be sufficient for the timing module to receive a transmission from a timing slave node.

Once the timing node ends, processing may either return to step 208, for transmission of another timing beacon, or may proceed to step 212, which involves processing of any received timing signal. At step 212, a delay may be computed between the transmission of the timing beacon at step 208 and the reception of the retransmitted timing beacon at step 210. The delay, or delta, may be used to determine a frequency offset, a phase offset, or both. The offset values may be sent to a timing module. In some embodiments, the timing master may not synchronize itself using the offset values, as it is the master in the master-slave relationship. In some embodiments, the timing master may update a network time source or may internally calibrate an internal GPS timing source. At step 214, the delta information may be sent as a second message to the timing slave node, which may then synchronize itself to the timing master.

In some embodiments, the timing master may maintain a list of slave nodes, and may synchronize each of them in turn. In some embodiments, the timing master may send out a single master beacon, listen for received retransmissions from one, many, or all slave nodes, and synchronize each of them in turn. In some embodiments, the delta information may be sent to the slave nodes asynchronously, and the synchronization protocol may not rely on its transmission to occur at a particular time or within a time window.

Figure 3:
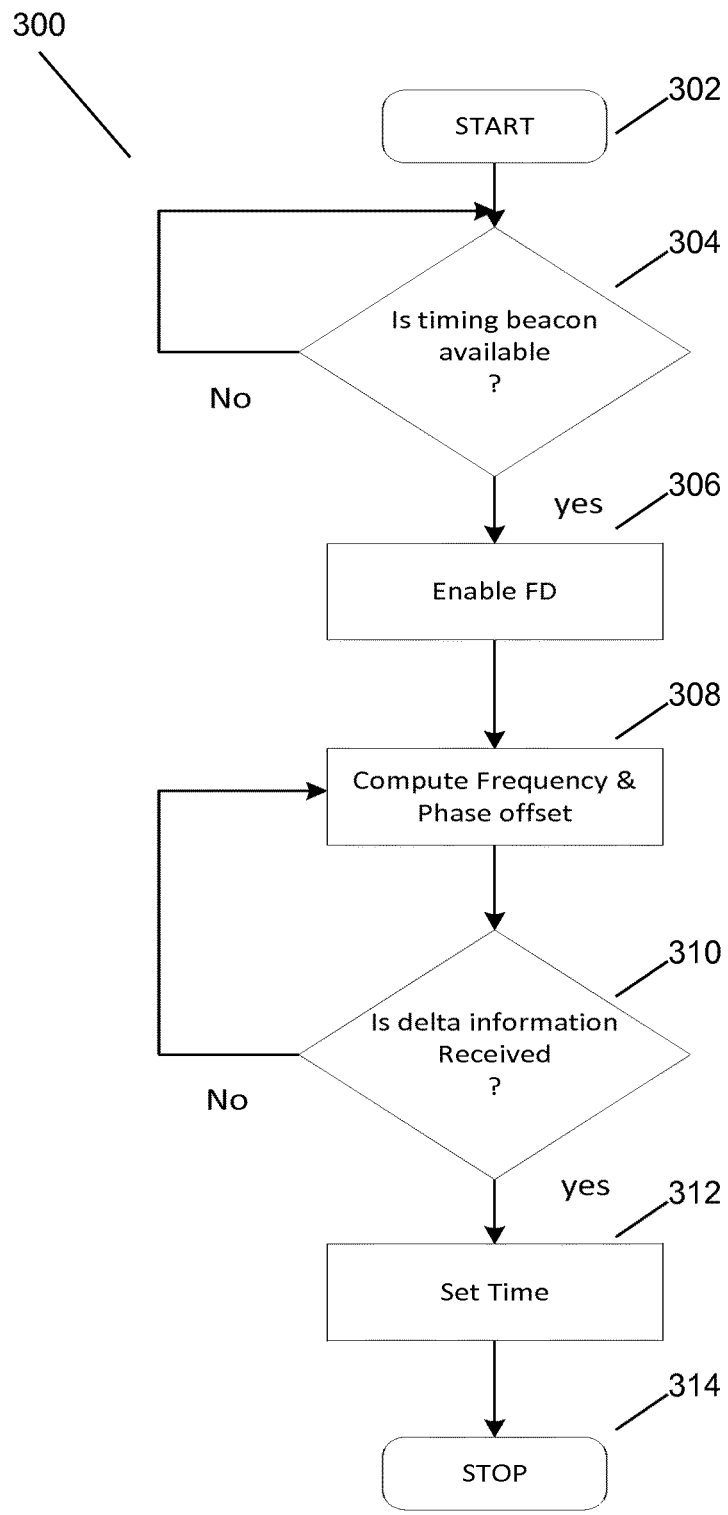
FIG. 3 is a flowchart of a method for synchronization at a slave node, in accordance with some embodiments.

FIG. 3 is a flowchart of a method for synchronization at a slave node, in accordance with some embodiments. At step 302, processing begins. At step 304, the slave node looks for a master node. If no master node is available, processing fails, or is delayed, or is repeated. The slave node may be preconfigured with a master node, in some embodiments, or may send out a message to determine whether other master nodes are within range, or may send a message to a central node to request a master, or may request to the central node to activate a master, in some embodiments.

At step 306, if a master node is available, the slave node may enable full duplex radio reception/transmission. Next, at step 306, a master node's beacon signal may be received, and frequency and phase offset may be computed based on the master node's beacon signal. Also at step 306, the master node's beacon signal may be retransmitted. In some embodiments, the beacon signal may be retransmitted within a designated window of time. In some embodiments, the beacon signals may be retransmitted together with the frequency and phase offset computed at the slave node. In some embodiments, the beacon signals may be retransmitted together with an identifier of the slave node, and/or an identifier of the beacon signal being retransmitted from the slave node.

At step 310, the slave node may wait for an additional message from the master node with delta information. When the delta information is received, at step 312, the delta information may be used to set the local time, as well as to synchronize phase and frequency of the transmitter, at the slave node. At step 314, processing stops.

Figure 4:
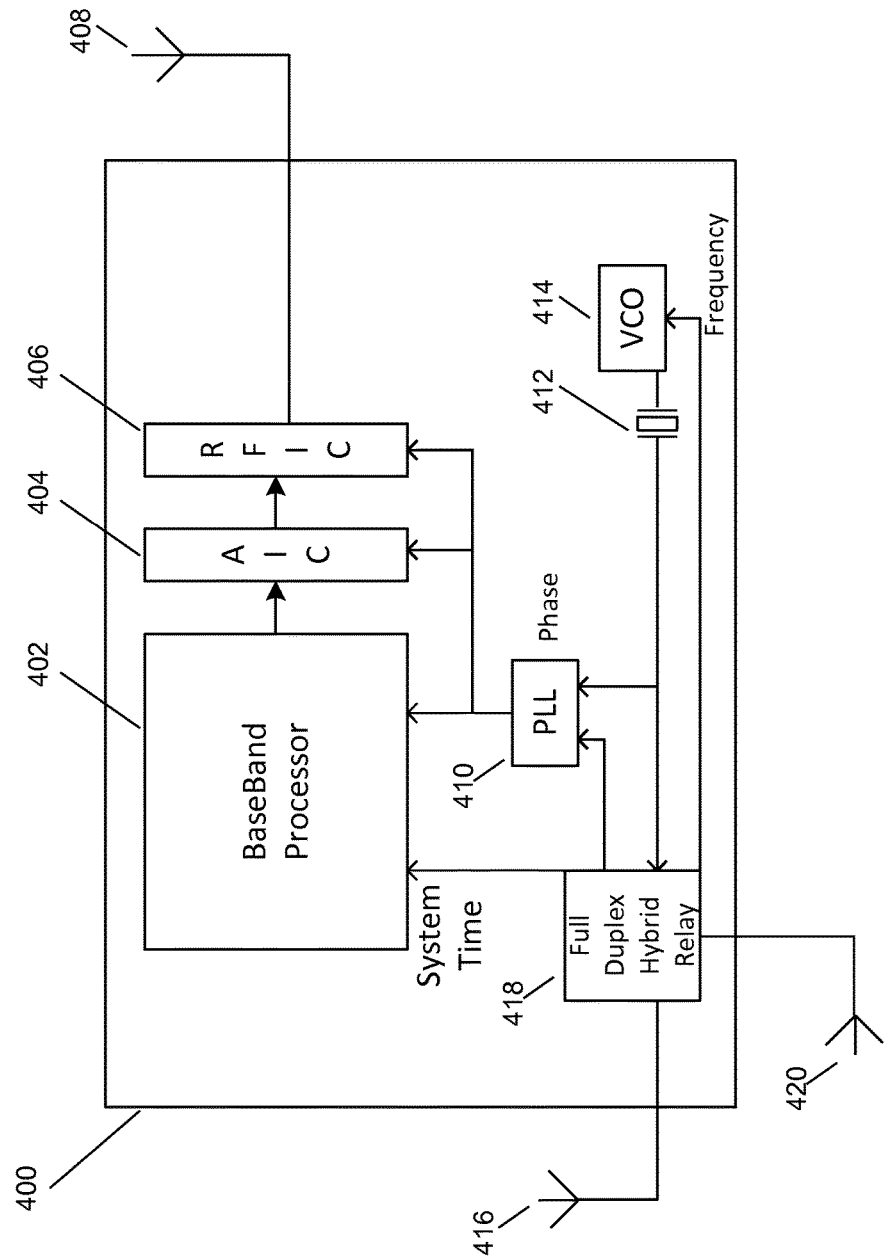
FIG. 4 is a block diagram of a hardware device for timing recovery from the received timing waveform, in accordance with some embodiments.

FIG. 4 is a block diagram of a hardware device for timing recovery from the received timing waveform, in accordance with some embodiments. System 400 includes baseband processor 402, antenna interface controller (AIC) 404, radio frequency integrated circuit (RFIC) 406, and transmit antenna 408. System 400 also includes receive antenna 416 and diversity receive antenna 420, full duplex hybrid relay 418, voltage controlled oscillator 414, crystal oscillator 412, and phase-locked loop 410. Not shown are a processor, a memory, amplifiers, filters, upconversion/downconversion components, mixers, and other components understood to be necessary by one of ordinary skill in the art. The baseband processor 402 may include a memory, in some embodiments.

In some embodiments, the full duplex hybrid relay 418 may be in the receive signal path with antennas 416 and 420, and may use received information such as timestamp and phase information received from a time master or other remote node via the receive signal path, to perform synchronization. In some embodiments, wherein one of the antennas 416 and 420 is a diversity antenna, the hybrid relay 418 may be configured to use the primary antenna, the diversity antenna, or both, for receiving timing signals. Time synchronization information may be kept within the hybrid relay 418, or sent as system time to baseband processor 402. Phase may be synchronized and may be sent to phase-locked loop 410, and then sent thereby to baseband processor 410, AIC 404, and RFIC 406. Frequency synchronization may be sent to VCO 414. Crystal 412 may send its frequency signal to hybrid relay 418, and the hybrid relay 418 may use the frequency signal obtained from reference crystal 412 together with the received information to obtain and maintain synchronization.

Further embodiments are contemplated. For example, in some embodiments, a TM node may send its beacon signal as a broadcast signal, reaching all TS nodes. In some embodiments, a TM node may send its signal as a signal directed to a single TS node. In some embodiments, the TM node may perform synchronization with each TS node individually and in turn; in other embodiments, the TM node may utilize multiple send/receive capability to perform synchronization with more than one TS node at a single time. The TM node may maintain a memory of the path characteristics, such as frequency shift and phase shift/delay for each slave node, and may update the memory over time with updated information received from the slave node and/or derived from received transmissions from the slave node. In some embodiments, synchronization may be initiated by the slave; in other embodiments, by the master; in other embodiments, by a network node in the core network. In some embodiments, synchronization may be performed at intervals; in some embodiments, synchronization may be performed based on the current synchronization status of a channel, such as when a timing slave drifts out of a configured synchronization band for either frequency or phase.

In some embodiments, a plurality of nodes may broadcast beacons at the same time, and the broadcasting nodes may use their full duplex receive capabilities to receive beacons sent from other nodes at the same time as the beacons being sent. For example, a timing master may send a message to a timing slave, initiating synchronization; the master and the slave may then send a beacon signal at a predetermined clock time; and the master and the slave may then receive the beacon signal sent from the other node to determine the channel characteristics and to determine any delay therefrom. In some embodiments, a plurality of nodes may send beacons and/or responses on the same frequency as each other, and a full duplex transceiver may be able to receive a response on the same frequency and at the same time (in other words, on the same physical channel) as is being used for transmission of the beacon.

In some embodiments, master-slave status may be rotated among several nodes in a network, such as a peer-to-peer mesh network. In some embodiments, calculation of the delay and/or timing offset may take place at the slave node, or at the master node, and may be sent to the master node, or to the slave node, respectively. In some embodiments, the slave node may use a calculated timing offset to synchronize its local clock and/or frequency generator, which may be with the use of a phase-locked loop and/or an oscillator, which may be a crystal oscillator, an electronic oscillator, and/or a microelectromechanical (MEMS) oscillator.

In some embodiments, where the above disclosure refers to a GPS that is connected to one or more nodes, the GPS may be internal or external to a node, may be coupled to a node, may be in communication with a node, or otherwise in use by a node, in addition to any modalities described above. In some embodiments, a GPS may be used for supplemental synchronization, or not used for synchronization. The GPS may be absent in some embodiments.

In some embodiments, the methods described herein may be implemented on a mesh network created using a plurality of mobile base stations provided with full-duplex capability. The mobile base stations may be in-vehicle base stations, with at least a pair of radios for access and backhaul, and with Wi-Fi or LTE capability, or both. Such base stations may be used as part of a network used to rapidly deploy a network in an area where fixed cell towers are unavailable or impractical.

In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention.

Although the present disclosure has been described and illustrated in the foregoing example embodiments, it is understood that the present disclosure has been made only by way of example, that the various characteristics described above of the various embodiments may be combined in different fashion than described above, and that numerous changes in the details of implementation of the disclosure may be made without departing from the spirit and scope of the disclosure, which is limited only by the claims which follow.

The invention claimed is:

1. A method, comprising:
   sending a timing beacon over a single full duplex radio channel from a timing master to a timing slave, the timing beacon being a first message;
   receiving the timing beacon over the single full duplex radio channel at the timing slave;
   sending a retransmitted beacon over the single full duplex radio channel from the timing slave to the timing master, the retransmitted beacon being a second message;
   receiving the retransmitted beacon over the single full duplex radio channel at the timing master;
   calculating a time synchronization delta at the timing master, the delta being specific to the timing master and the timing slave, based on a difference of a reception time of the retransmitted timing beacon and a transmission time of the previously-sent timing beacon, as observed at the timing master; and
   sending the time synchronization delta of the timing beacon and the retransmitted beacon from the timing master to the timing slave, asynchronously as a third message specific to the timing slave, to synchronize to the timing master upon receipt of the third message,
   wherein the timing master and the timing slave are each multi-radio access technology (multi-RAT) base stations for providing a user with access to a telecommunications core network via at least one gateway node in the mesh network and utilizing the single full duplex radio channel, and
   wherein the timing master and the timing slave are selected from nodes in a mesh network by a coordinator,
   thereby achieving time, frequency, and phase synchronization among the nodes in the mesh network.

2. The method of claim 1, further comprising using a plurality of antennas at the timing master or the timing slave in a multiple-in, multiple out (MIMO) system.

3. The method of claim 1, further comprising using a plurality of antennas at the timing master or the timing slave in a diversity antenna system.

4. The method of claim 1, further comprising using a single antenna for both the sending and the receiving in conjunction with a full duplex transceiver at the timing master or the timing slave.

5. The method of claim 1, further comprising using a hybrid analog/digital self-interference cancellation system at the timing master or the timing slave.

6. The method of claim 1, wherein the beacon contains a timestamp.

7. The method of claim 1, wherein the retransmitted beacon is a result of processing performed on the beacon.

8. The method of claim 1, wherein sending of a beacon is performed by a timing master and sending of a retransmitted beacon is performed by a timing slave.

9. The method of claim 1, further comprising simultaneously sending and receiving the synchronization information over the single full duplex radio channel.

10. The method of claim 1, further comprising sending a delta of the beacon and the retransmitted beacon over the single full duplex radio channel.

11. The method of claim 1, further comprising determining a carrier frequency offset using the delta, and calibrating a frequency of a local oscillator using the carrier frequency offset.

12. A system, comprising:
   a timing master having full duplex capability and configured to transmit a timing beacon signal and to receive a timing response signal, the timing beacon signal being a first message and the timing response signal being a second message; and
   a timing slave configured to receive the timing beacon signal and configured to retransmit the timing beacon signal as a timing response signal,
   wherein the timing master is further configured to calculate a time synchronization delta at the timing master, the delta being specific to the timing master and the timing slave, based on a difference of a reception time of the retransmitted timing beacon and a transmission time of the previously-sent timing beacon, as observed at the timing master, and to send the time synchronization delta of the timing beacon and the retransmitted beacon from the timing master to the timing slave, asynchronously as a third message specific to the timing slave, to synchronize to the timing master upon receipt of the third message, wherein the timing master and the timing slave are each multi-radio access technology (multi-RAT) base stations for providing a user with access to a telecommunications core network via at least one gateway node in the mesh network and utilizing a single full duplex radio channel, and wherein the timing master and the timing slave are selected from nodes in a mesh network by a coordinator, thereby achieving time, frequency, and phase synchronization among the nodes in the mesh network.

13. The system of claim 12, further comprising a plurality of timing slaves in communication with the timing master.

14. The system of claim 12, wherein the timing master is coupled to a global positioning system (GPS) timing source or a network time source.

15. The system of claim 12, wherein the timing response signal contains a retransmitted timing beacon signal.

16. The system of claim 12, wherein the timing master is configured to transmit the timing beacon signal with an identifier of the master node.

17. The system of claim 12, wherein the timing master is configured to compute a delay between transmitting the timing beacon signal and receiving the retransmitted timing beacon signal, and to generate a synchronization offset specific to the timing slave.

18. The system of claim 12, wherein the timing master is configured to send the synchronization offset to the timing slave.

19. The system of claim 12, wherein the timing master is configured to permit frequency synchronization or phase synchronization of the timing slave.

20. The system of claim 12, wherein the coordinator is further configured to assign a unique identifier to the timing master.

21. The system of claim 12, wherein the timing master is rotated among a plurality of nodes in the mesh network.

22. The method of claim 1, wherein the coordinator is a cloud coordination server and coordinates the nodes in the mesh network.

23. The method of claim 1, wherein the timing master is assigned a unique identifier generated at the coordinator.

24. The method of claim 1, further comprising rotating timing master status and timing slave status among the nodes.

* * * * *